United States Patent [19]
Bloomfield et al.

[11] 3,973,993
[45] Aug. 10, 1976

[54] PRESSURIZED FUEL CELL POWER PLANT WITH STEAM FLOW THROUGH THE CELLS

[75] Inventors: David P. Bloomfield; Michael B. Landau, both of West Hartford, Conn.

[73] Assignee: United Technologies Corporation, Hartford, Conn.

[22] Filed: Feb. 12, 1975

[21] Appl. No.: 549,596

[52] U.S. Cl. ............................. 136/86 C; 136/86 R
[51] Int. Cl.² ...................... H01M 8/04; H01M 8/06
[58] Field of Search ............. 136/86 A, 86 B, 86 C, 136/86 R

[56] References Cited
UNITED STATES PATENTS

| | | | |
|---|---|---|---|
| 668,838 | 2/1901 | Lavison | 136/86 R |
| 1,182,759 | 5/1916 | Emanuel | 136/86 R |
| 3,112,229 | 11/1963 | Bacon et al. | 136/86 R |
| 3,311,097 | 3/1967 | Mittelstendt | 123/119 |
| 3,404,529 | 10/1968 | Lagersbrom | 60/6 |
| 3,507,702 | 7/1970 | Sanderson | 136/86 R |
| 3,615,850 | 10/1971 | Chludzinski | 136/86 C |

*Primary Examiner*—John H. Mack
*Assistant Examiner*—H. A. Feeley
*Attorney, Agent, or Firm*—Stephen E. Revis

[57] ABSTRACT

A fuel cell power plant for producing electricity uses pressurized air and fuel in the cells. The air is compressed by compressor apparatus powered by waste energy in the form of hot pressurized gases including hot pressurized steam produced by the power plant. In one embodiment the compressor apparatus includes a turbine operably connected to a compressor, and hot pressurized gases produced by the power plant flow into the turbine thereby driving the compressor. The steam is generated by heat from the fuel cells, passes through the fuel cells adjacent the cathode electrode thereof, and is delivered into the turbine along with the other gases.

16 Claims, 5 Drawing Figures

FIG_1

PRESSURIZED FUEL CELL POWER PLANT WITH STEAM FLOW THROUGH THE CELLS

BACKGROUND OF THE INVENTION

1. Field of the Invention

This invention relates to power plants and more particularly to electricity producing power plants utilizing fuel cells as the power source.

2. Description of the Prior Art

In the fuel cell art there have been three general approaches to improving fuel cell performance. One approach is to increase the temperature at which the fuel cell operates. This approach, however, is limited by material corrosion and, in acid electrolyte cells, by acid evaporation. A second approach is to attempt to increase the amount of catalyst per square inch of electrode surface area. This approach, however, is limited by the increased expense and practical limitations in the amount of catalyst that can possibly be put on a certain area of electrode. A third approach is to increase the pressure of the reactants within the fuel cell. It is well known in the art that fuel cells perform better as reactant pressures increase. One of the major stumbling blocks to this approach is that it requires considerable energy to pressurize the reactants. It has been considered, for example, that the energy to pressurize reactants should be the electrical energy produced by the fuel cell; that electrical energy would be used to drive a compressor. The problem is that it takes about 30% of the electrical output of the cell stack to drive a compressor to produce a reasonable reactant pressure. This means that the fuel cell would have to be increased in size by about 50% to make up for the loss of usable electrical power. Since a fuel cell stack is itself the most expensive component of a fuel cell power plant, the increase in performance is offset by the increased cost due to increased cell size. Because total electrical power output of the cell stack is increased, other components of the power plant will have to be increased proportionately such as the condensing apparatus and the fuel conditioning apparatus. This further increases size and cost of the power plant. Further, other apparent disadvantages in the power plant system utilizing high pressure reactants are the cost of additional equipment to pressurize the reactants, the necessity for more expensive sealing arrangements, and the additional cost due to the necessity of utilizing stronger components to contain the higher pressures. In view of the foregoing considerations, with regard to power plants utilizing air as the oxidant, it has always been considered that no net advantage could be achieved, and most likely, there would be a net disadvantage in going to power plants utilizing high pressure reactants in the fuel cell stack. For the foregoing reasons, up to the present time, these fuel cell power plants have always used reactants at atmospheric pressures.

RELATED APPLICATIONS

The following applications, filed on even date herewith and of common assignee, pertain to subject matter related to the present invention:

1. "Pressurized Fuel Cell Power Plant" by D. Bloomfield and R. Cohen, U.S. Ser. No. 549,600;
2. "Pressurized Fuel Cell Power Plant" by D. Bloomfield, U.S. Ser. No. 549,601;
3. "Pressurized Fuel Cell Power Plant With Air Bypass" by M. Landau, U.S. Ser. No. 549,598;
4. "Pressurized Fuel Cell Power Plant" by M. Menard, U.S. Ser. No. 549,597;
5. "Pressurized Fuel Cell Power Plant With Single Reactant Gas Stream" by D. Bloomfield, U.S. Ser. No. 549,602;
6. "Pressurized Fuel Cell Power Plant With Steam Powered Compressor" by D. Bloomfield, U.S. Ser. No. 549,599.

SUMMARY OF THE INVENTION

One object of the present invention is an economically attractive fuel cell power plant.

Another object of the present invention is a more efficient fuel cell power plant.

A further object of the present invention is a fuel cell power plant which, when compared to a prior art fuel cell power plant of similar capacity, is smaller in size and has lower overall hardware costs.

An additional object of the present invention is an attractive fuel cell power plant that requires no water recovery.

Accordingly, the present invention is an electricity generating power plant utilizing fuel cells wherein air is supplied to the fuel cells at high pressure from a compressor which is driven, at least in part, by energy from the fuel cell effluent gases, fuel conditioning apparatus waste heat, and steam generated by heat from the fuel cells. In one embodiment of the present invention the fuel conditioning apparatus includes a steam reforming reactor and a reactor burner, and both the air and the fuel are supplied to the cells at high pressure; water is used as the coolant for the cell stack and is converted to steam as it passes therethrough; the energy in the steam, the cathode gas stream effluent, the anode gas stream effluent, and the steam reformer reactor burner effluent, is used, at least in part, to drive a turbine which in turn runs a compressor for pressurizing the air stream to the cathode.

Since the electrical energy output from the cell stack is not used to pressurize the oxidant, there is no need to increase the size of the fuel cell stack in order to maintain power plant capacity. As a matter of fact, full advantage can be taken of the performance improvement in the fuel cell stack such that the stack may produce even more electrical energy without an increase in its size. Furthermore, other heretofore unrecognized, benefits arise throughout the power plant to further enhance the attractiveness of a fuel cell power plant designed according to the present invention. For example, one advantage of the present invention is that it permits a reduction in the size of the steam reforming reactor (if one is used) of the power plant by a factor of about two as compared to the steam reforming reactor used in a prior art fuel cell power plant of similar capacity.

A further feature of a preferred embodiment of the present invention is the elimination of condensing apparatus; however, it is contemplated that a supply of water is available for use in the power plant. This water is used to cool the stack by being passed therethrough. The heat from the stack converts a portion of the water to steam. This steam is used as required in the steam reforming reactor of the fuel conditioning apparatus. Excess steam enters the cathode gas space of the fuel cell along with compressed air from the compressor. The effluent from the cathode gas space, which includes this excess steam, passes through a turbine for driving the compressor. By this arrangement a larger capacity compressor/turbine may be used in the power plant than would otherwise be permissible. This is particularly advantageous for small capacity power plants (i.e., less than about 100 kilowatts) wherein even the smallest commercially available turbocharger produces more air that is needed by the stack and which would otherwise create problems if passed through the stack; these problems are eliminated by the present invention.

The foregoing and other objects, features and advantages of the present invention will be more fully explained and will become more apparent in the light of the following detailed description of preferred embodiments thereof as illustrated in the accompanying drawing.

DESCRIPTION OF THE PREFERRED EMBODIMENT

Figure 1:
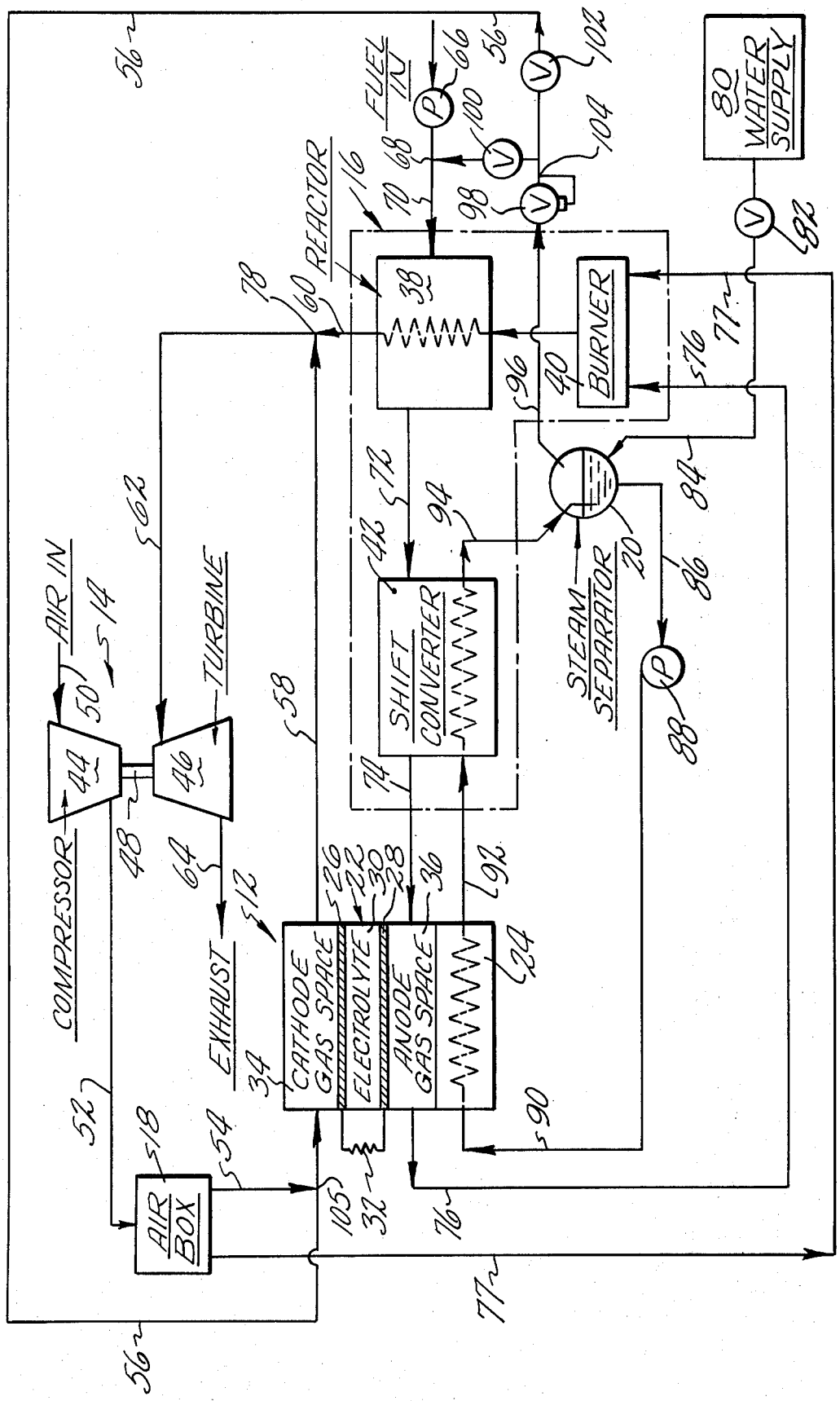
FIG. 1 is a schematic of a power plant according to the present invention.

Consider, as an exemplary embodiment of the present invention, the power plant depicted schematically in FIG. 1 and generally designated by the numeral 10. The power plant 10 includes a fuel cell stack generally designated by the numeral 12, compressor apparatus generally designated by the numeral 14, fuel conditioning apparatus generally designated by the numeral 16, an air flow splitter or air box 18, a steam separator 20, and various pumps and controls which will be hereinafter described. The fuel cell stack 12 may comprise any conventional type of fuel cells which operate on gaseous reactants. In this embodiment the oxidant is air and the fuel is hydrogen.

The stack 12 will generally comprise a plurality of fuel cells connected in series electrically through a load, but is herein depicted as only comprising a single cell 22 for the purpose of clarity and a thermal management portion 24. As herein shown each cell includes a cathode electrode 26 spaced from an anode electrode 28 and including an electrolyte retaining matrix 30 therebetween. In this preferred embodiment the electrolyte is liquid phosphoric acid but the invention is not intended to be limited thereto and base electrolytes as well as solid types of electrolytes such as metal oxide electrolytes or solid polymer electrolytes are contemplated as being useful in a power plant designed according to the present invention. The electrodes 26, 28 are connected in series through a load 32. Each cell 22 also includes a cathode gas space 34 on the nonelectrolyte side of the cathode electrode 26 and an anode gas space 36 on the nonelectrolyte side of the anode electrode 28. In this embodiment the fuel conditioning apparatus 16 comprises a steam reforming reactor 38, a reactor burner 40, and a shift converter 42. The compressor apparatus 14 is a turbocharger comprising a compressor 44 driven by a turbine 46 through a shaft 48, and will be described hereinafter in more detail as will other components of the power plant 10.

Still referring to FIG. 1, in operation air enters the compressor 44 via conduit 50 and is compressed. Any pressure greater than atmospheric pressure will yield some benefits as compared to unpressurized power plants; however, about 2 or higher atmospheres of pressure are desirable in order that substantial benefits are realized for the total power plant. This pressurized air enters the air box 18 via conduit 52. The air box includes controls and valves for properly proportioning the air flow to various components. A portion of the air leaves the air box 18 via conduit 54, is combined at point 105 with steam in a conduit 56 from the steam separator 20, and passes into the cathode gas space 34. As it travels through the cathode gas space 34, the oxygen in the air is electrochemically reacted within the cathode electrode 26 with the phosphoric acid electrolyte in the matrix to produce electricity and water, some of the water being evaporated back into the air stream flowing through the cathode gas space 34. The moist cathode effluent, including the steam from conduit 56, leaves the gas space 34 via conduit 58 where it is combined at point 78 with the effluent gases in a conduit 60 from the burner 40. These combined gases, including the steam, thereupon pass into the turbine 46 via a conduit 62 and provide energy to power the turbine 46 which in turn drives the compressor 44. After passing through the turbine 40 any further energy in the gas stream may be either thrown away via a conduit 64 or may be used elsewhere in the power plant.

On the anode side, a hydrogen containing liquid fuel such as naphtha, which has been increased in pressure by a pump 66 to about the same pressure as the air entering the cathode gas space 34, is mixed with steam from the steam separator 20 at 68 and enters the steam reforming reactor 38 via a conduit 70. Although not shown, it is preferable that the fuel be atomized as it is combined with the steam at 68 so that the stream entering the reactor 38 is in the vapor state. Although in this embodiment a liquid fuel is used so that it may easily and with relatively little energy be pumped up to pressure, if a pressurized supply of gaseous fuel such as methane happens to be available, it may be used.

Partially processed fuel leaves the reactor 38 by means of a conduit 72 and enters a shift converter 42 to reduce the carbon monoxide content of the gas stream leaving the reactor 38. In the shift converter carbon monoxide plus water combine in the presence of a catalyst to form hydrogen and carbon dioxide plus heat according to the well known equation as follows:

$$CO + H_2O \rightarrow H_2 + CO_2 + \text{heat} \qquad 1.$$

Although the fuel conditioning apparatus 16 is shown comprising a shift converter in addition to a steam reforming reactor, it is contemplated that fuel conditioning apparatus of power plants designed according to the present invention may not require a shift converter or may require a selective oxidizer in addition to the shift converter and the reactor. The requirements of the fuel conditioning apparatus are dependent in part upon the type of raw fuel being used and upon the particular design of the cells in the fuel cell stack. Indeed, the fuel conditioning apparatus may include a partial oxidation hydrogen generator instead of a steam reforming reactor and reactor burner.

Processed fuel leaves the fuel conditioning apparatus 16 via a conduit 74 whereupon it enters the anode gas space 36 of the fuel cell 22 where it electrochemically reacts with the electrolyte. In this embodiment the anode gas stream is contemplated as being at about the same pressure as the cathode gas stream in order to minimize the risk of gas crossover between the anode and cathode gas spaces. The anode effluent gas stream leaves the anode gas space 36 by means of a conduit 76 and is fed into the reactor burner 40 along with compressed air via a conduit 77. The burner 40 provides the heat for the steam reforming reactor 38. The anode gas stream effluent contains enough unburned hydrogen gas such that there is no need for the burner 36 to have a separate fuel supply. However, if desired, the burner 40 may be provided with its own separate fuel supply or may be run on a portion of the processed fuel leaving the fuel conditioning apparatus 16. The anode gas stream effluent would then most likely be combined directly with the gases in the conduits 58 and 60 rather than passing through the burner 40. In the embodiment shown in FIG. 1, the burner exhaust products, which include the anode gas stream effluent, are combined at 78 with the effluent from the cathode gas space 34 and pass together therewith into the turbine 46.

In this embodiment waste energy from the fuel conditioning apparatus is delivered to the turbine 46 by passing the reactor burner effluent gases into the turbine. If the power plant had no steam reforming reactor and thus no reactor burner other means would have to be provided for delivering waste energy from the fuel conditioning apparatus into the turbine, such as by a heat exchanger in operable relationship with the fuel conditioning apparatus and with any other gas stream being delivered into the turbine.

Cooling of the stack 12 is accomplished by passing water through the thermal management portion 24 of the stack 12. As heretofore stated, a supply of water is needed for use in the power plant. The water supply is herein designated by the numeral 80 and may be a water tank or a body of water such as a lake or river. The water from the water supply 80 passes through a control valve 82 which is responsive to the water level in the steam separator 20, maintaining the same at a substantially constant level thereby insuring a substantially constant mass of liquid water entering the thermal management portion 24 of the stack 12 no matter how much steam is produced in the coolant loop. The water enters the steam separator 20 via a conduit 84 and leaves via a conduit 86 to a pump 88 which pumps it around the coolant loop. The liquid water is delivered from the pump 88 into the thermal management portion 24 via a conduit 90. A portion of the water is converted to steam depending on the pressure of the coolant (which controls its boiling point) and the amount of heat being generated by the stack 12. The steam and liquid water leave the stack 12 and pass into heat exchange relationship with the shift converter 42 via a conduit 92. The shift converter reaction produces heat which converts additional water to steam. The water and steam is delivered from the shift converter 42 into the steam separator 20 via a conduit 94. In the steam separator 20 the steam is separated from the water and leaves via a conduit 96. The liquid water is recirculated through the stack 12. The steam in the conduit 96 passes through a pressure control valve 98 and then through either a control valve 100 or a control valve 102. The pressure control valve 98 maintains a constant pressure at a point 104 upstream of the valves 100, 102 so that these latter valves are always working with a supply of steam at constant pressure. The valve 100 controls the amount of steam fed to the reactor 38 and which is mixed with raw fuel at point 68 in the conduit 70. The proper operation of the reactor 38 depends upon a proper ratio of fuel and steam. The amount of steam and fuel fed into the reactor 38 is of course dependent upon the current output desired from the stack 12. Excess steam, or that steam not required for the reactor 38, passes through the valve 102 into the conduit 56. The valve 102 is responsive to the temperature of the stack 12. For example, if it is desired that the cell operate at 300°F at all power settings, when the cell temperature begins to rise above 300°F the valve 102 will open thereby reducing the pressure in the coolant loop and increasing the steam flow to the cathode gas space 34. This reduces the temperature at which the water boils in the coolant loop thereby increasing the $\Delta T$ between the stack and the coolant flowing therethrough. In this way more heat may be rejected by the stack and its temperature will decrease. If the temperature of the stack begins to fall below 300°F the valve 102 will close thereby increasing the pressure in the coolant loop and increasing the temperature at which the water boils. This decreases the $\Delta T$ between the stack and the coolant flowing therethrough thereby causing the stack temperature to increase. In this manner stack temperature may be maintained within a narrow range at all operating conditions.

The steam in the conduit 56 is combined with air from the compressor 44 at 105 and passes through the cathode gas space 34 whereupon it is combined with the effluent from the reactor burner 40 and passes into the turbine 46 via the conduit 62.

Figure 2:
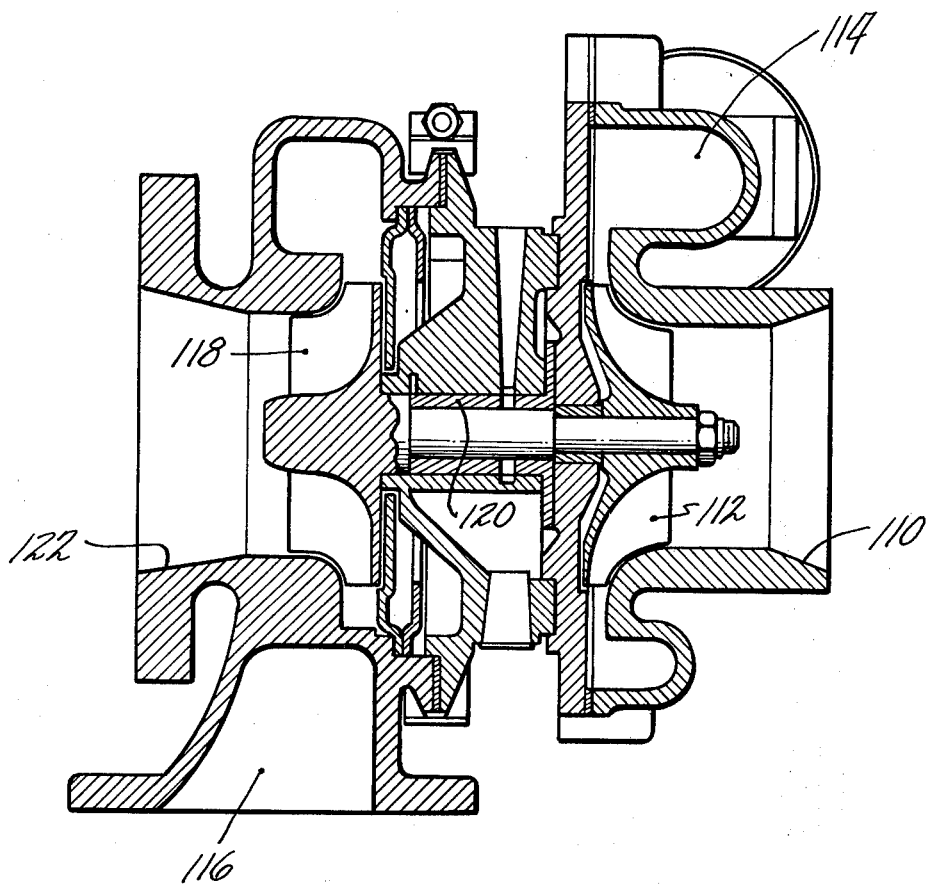
FIG. 2 is a cross sectional view of a turbocharger which may be used in power plants of the present invention.

As an example of a turbocharger suitable for use in a power plant designed according to the present invention, consider the turbocharger shown in FIG. 2. Ambient air enters a compressor duct 110 and impinges upon a single stage centrifugal impeller 112 which imparts a velocity head to the air. The high velocity air flows into a diffuser 114 where the velocity head is changed to a pressure head. In the embodiment of FIG. 1 the compressed air would leave the diffuser 114 via the conduit 52 and, after passing through the air box 18 would be introduced into the cathode gas space 34. On the other side, hot gases plus steam enter the turbine inlet 116 (such as from the conduit 62 in FIG. 1) and flow through a centrifugal turbine rotor 118 which converts the thermal energy of the gas stream to shaft horsepower to drive a shaft 120 connected to the compressor impeller 112. The gases are exhausted via a turbine outlet duct 122.

As heretofore mentioned the present invention is particularly suited to power plants having a capacity of about 100 kilowatts or less. For example, assume that the power plant of FIG. 1 is a 40 kilowatt power plant. The lowest capacity commercially available turbochargers deliver about three to four times the air flow required by the stack in such a power plant. For example, the Rajay Model 300B turbocharger is one of the smallest available and provides air at a maximum of about 3 atmospheres pressure at a flow rate of about 250 cubic feet per minute. If this amount of air were passed through the size stack generally used in a 40 kilowatt prior art power plant the partial pressure of water vapor in the cathode gas space effluent would be so low that it would require condensing apparatus of enormous size to remove the amount of water needed in the steam reforming reactor. If, as is the usual case, the condensing apparatus uses ambient air as the coolant, it might be virtually impossible to remove the necessary water from the gas stream. Indeed, not only would this excess air be prohibitive in a conventional prior art power plant, but it would also be prohibitive in a turbocharged fuel cell power plant which depended upon condensing apparatus to obtain water for the steam reforming reactor.

The present invention has overcome this problem since there is no water recovery. Not only is there no water recovery, but by running the stack 12 at very low oxygen utilization, which is the case when large amounts of excess air are passed through the cathode gas space, cell performance is greatly improved. This will be explained hereinafter in more detail.

Although what is pictured in FIG. 2 is representative of what is typically referred to in the art as a "turbocharger" the present invention is not intended to be limited thereto but may be any apparatus which uses the energy of a hot pressurized gaseous medium (typically exhaust gases) to compress another gas. For example, any heat engine capable of driving a compressor and which itself may be powered by a hot pressurized gas stream may be used. Also, a Comprex (registered trademark of Brown Boveri & Company, Ltd., Bade, Switzerland) supercharger which compresses air by direct transmission of energy from an expanding gas utilizing compression and expansion waves, or other device which works on similar principles, may be used. The Comprex supercharging concept is well known in the art and is more fully described in an ASME paper No. 58-GTP-16 titled "The comprex . . . A New Concept of Diesel Supercharging" by Max Berchtold and F. J. Gardiner, published in March 1958.

A further problem in running fuel cell stacks at very low oxygen utilizations in prior art power plants is the reduction in the temperature of the stack due to the large mass of air flowing therethrough. It may be required that additional fuel be burned in either an auxiliary burner or in the reactor burner in order to make up for this loss in temperature. Although the low oxygen utilization would increase the stack efficiency, the overall system efficiency would be reduced due to the burning of the additional fuel. The low oxygen utilization also creates other problems in that large amounts of relatively cool gases leaving the cathode gas space of the stack reduce the overall temperature of the gases entering the turbine. If the mass flow rate out of the turbocharger compressor is about the same as the mass flow rate into the turbocharger turbine, a lower turbine inlet temperature would result in a decrease in the speed of the compressor which in turn would mean a reduction in the pressure of the air delivered by the compressor. This would be unacceptable since it is the high pressure of the air which results in many improvements throughout the power plant as will hereinafter be explained in more detail. In the power plant of the present invention a considerable mass of steam is combined with the air passing through the cathode gas space 34 and eventually passes through the turbine 46 along with other effluent gases. In other words, there will be more mass flowing through the turbine 46 than is pumped out from the compressor 44. This additional mass compensates for the decreased turbine inlet temperature thereby maintaining the speed of the compressor and the pressure of the air flow therefrom.

An important advantage of the present invention is the high utilization of stack waste heat. This is accomplished by the manner in which steam is generated and used. In power plants wherein condensers are used to obtain water for the steam reforming reactor, heat in the gases flowing through the condensing apparatus is thrown away in order to reduce the temperature of the gases to the dew point so that water may be removed therefrom. This water is then usually delivered into a boiler in order to convert it into steam for the reactor. The boiler is usually in the stack coolant loop and it obtains its heat from the stack as the coolant passes through the stack and then into the boiler. Usually there is more heat generated by the stack and transferred to the coolant than is needed by the boiler to produce steam. This excess heat is also thrown away in a radiator in order that the temperature of the coolant is low enough to be recirculated through the stack. In the present invention there is no conventional boiler and there is no radiator and there is no condensing apparatus. The present invention greatly simplifies the stack temperature control. The stack itself acts as the boiler and all the waste heat thereof is used to convert water into steam. By maintaining a certain pressure in the coolant loop and by maintaining a certain flow rate of water through the stack, all the stack waste heat is used to change the water to steam and either more or less steam is produced without the requirement for changing the mass flow rate of water through the cell or for dumping waste heat overboard. Furthermore, all the steam that is produced is used in either the reactor or in the cathode gas space. The only heat thrown away is in the turbine exhaust.

Figure 3:
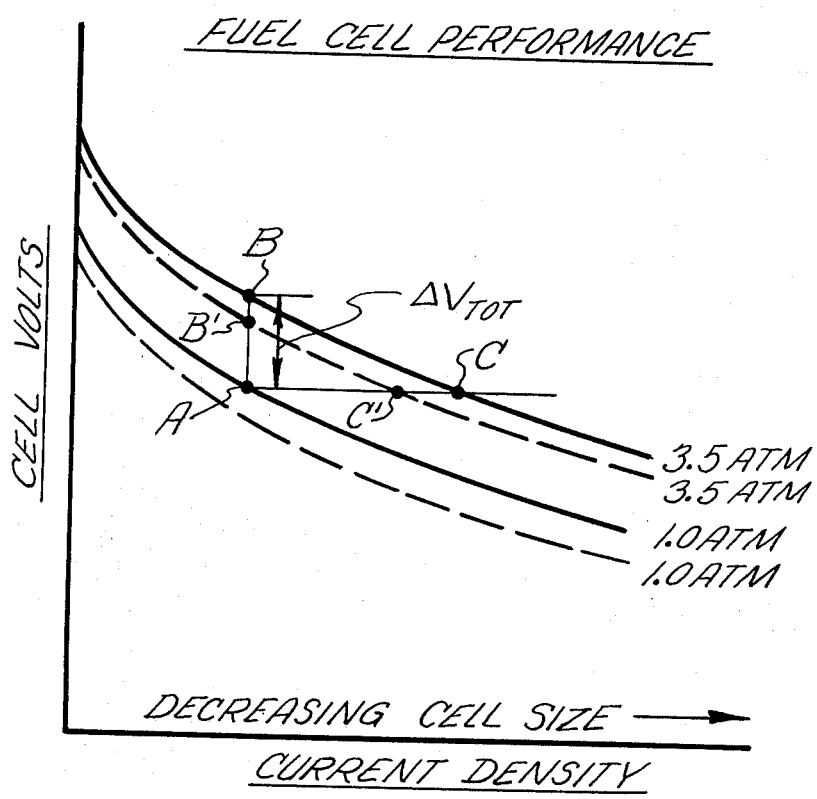
FIG. 3 is a graph illustrating the performance of fuel cells used in power plants of the present invention.

In order to more fully appreciate and understand other advantages and the operation of the present invention, consider the graph of FIG. 3 which may be used to compare the performance of a fuel cell using reactants at atmospheric pressure to the performance of the same fuel cell using, for example, reactants at about 3.5 atmospheres of total pressure. There are several variables which must be taken into consideration when making comparisons between cells. Reactant utilization is the weight flow rate of reactants at either the anode or the cathode which is consumed in the cell by the electrochemical reaction divided by the weight flow rate of hydrogen or oxygen, respectively, into the cell. In a fuel cell operating on oxygen and hydrogen there is thus oxygen utilization ($U_{O_2}$) at the cathode and hydrogen utilization ($U_{H_2}$) at the anode. Raising the utilization of either of the reactants automatically lowers the partial pressure of that reactant as seen by either the anode or the cathode since more reactant is taken out of the gas stream per pound of mass flow through the cell; thus, the average amount of reactant in the gas stream over the surface of that particular electrode is less from the inlet to the outlet. The curve labeled 1.0 atmosphere in FIG. 3 represents cell performance at one particular hydrogen utilization and one particular oxygen utilization. The solid curve labeled 3.5 atmospheres represents cell performance at these same utilizations but at higher pressures. Also, the cells represented by each of these curves is assumed to be operating at the same temperature. The well known Tafel equation states that there will be an increase in cathode performance (i.e., an increase in voltage) when the partial pressure of oxygen increases and vice versa. This equation is set forth below.

$$\Delta V_{cathode} = K(mv) \log \left[ \frac{P_{O_2}}{P_{O_2(ref)}} \right] \quad (2)$$

where $K$ is a constant. The Nernst equation states that there will be an increase in anode performance (i.e., an increase in cell voltage) when the partial pressure of hydrogen is increased and vice versa. The Nernst equation is set forth below.

$$\Delta V_{anode} = C(mv) \ln \left[ \frac{P_{H_2}}{P_{H_2(ref)}} \right] \quad (3)$$

where $C$ is a constant. It is apparent that for constant temperature and for constant utilization, an increase in the total pressure of the reactants results in an increase in the partial pressure of both reactants leading to an improvement in both cathode and anode performance according to equations (2) and (3) above. The total improvement in fuel cell performance may be simply stated as follows:

$$\Delta V_{total} = \Delta V_{cathode} + \Delta V_{anode} \quad 4.$$

The left hand side of equation (4) is illustrated by the graph of FIG. 3 as the difference in voltage between points A and B at constant current density. Further, from the graph of FIG. 3, it can be seen that by operating at reactant pressures of 3.5 atmospheres the cell size may be decreased without decreasing the cell voltage output by operating at point C.

As will hereinafter be explained, in order to improve the performance of the steam reforming reactor, it is desirable to increase the hydrogen utilization. The dotted curves on the graph of FIG. 3 are also representative of cell performance at 1.0 and 3.5 atmospheres of reactant pressure, respectively, as labeled. However, these curves represent the performance of cells similar in all respect to cells represented by the solid curves except that the hydrogen utilization has been increased. Note that at 3.5 atmospheres the cell can run at a higher hydrogen utilization and still show improvement over the prior art such as an increase in cell voltage by operating at point B' or an increase in current density (i.e., a decrease in cell size) for the same cell voltage by operating at point C'. On the other hand, notice that for a cell using reactants at atmospheric pressure an increase in hydrogen utilization means either increasing the size of the cell to maintain the same cell voltage or taking a voltage loss in order to maintain the same cell size. The importance of the ability to operate at high hydrogen utilization without sacrificing performance or increasing the size of the cell will become apparent in the hereinafter set forth discussion relating to the operation of the steam reforming reactor 38 of the power plant of the present invention.

As heretofore mentioned with respect to the power plant of the present invention, the oxygen utilization is very low in view of the excess air flow from the turbocharger. Still referring to FIG. 3, this has the effect of shifting the solid line curves upward and improving cell performance according to equation (2) set forth above. As also heretofore mentioned, although decreasing oxygen utilization would also improve performance in a fuel cell operating at atmospheric pressures, the problems created thereby result in a decrease in overall system efficiency and it is thus self-defeating.

In prior art phosphoric acid electrolyte fuel cells operating over 300°F and at atmospheric pressures evaporation of the phosphoric acid electrolyte occurs. The effect of acid evaporation is to require that acid be added regularly during the liftime of the power plant. Acid evaporation is a function of the mass flow rate of air through the cathode gas space, the partial pressure of acid, and the total gas pressure in the cathode gas space according to the following relationship:

$$\text{Acid loss} = f \left\{ \text{flow rate} \times \frac{\text{vapor pressure of acid}}{\text{total pressure}} \right\} \quad (5)$$

From the foregoing formula it is apparent that increasing the total pressure of the gases flowing through the cathode gas space reduces acid loss. It is also a fact that increasing the total pressure results in a decrease in the vapor pressure of the acid due to dilution of the electrolyte, further reducing acid loss. Also, due to the higher reactant pressures fuel cells incorporated in power plants of the present invention may be run at higher oxygen utilizations, and therefore the flow rate of air through the cathode gas space is lower and acid loss is further reduced. It has been determined that the foregoing factors combined reduce acid loss by an order of magntidue.

Figure 4:
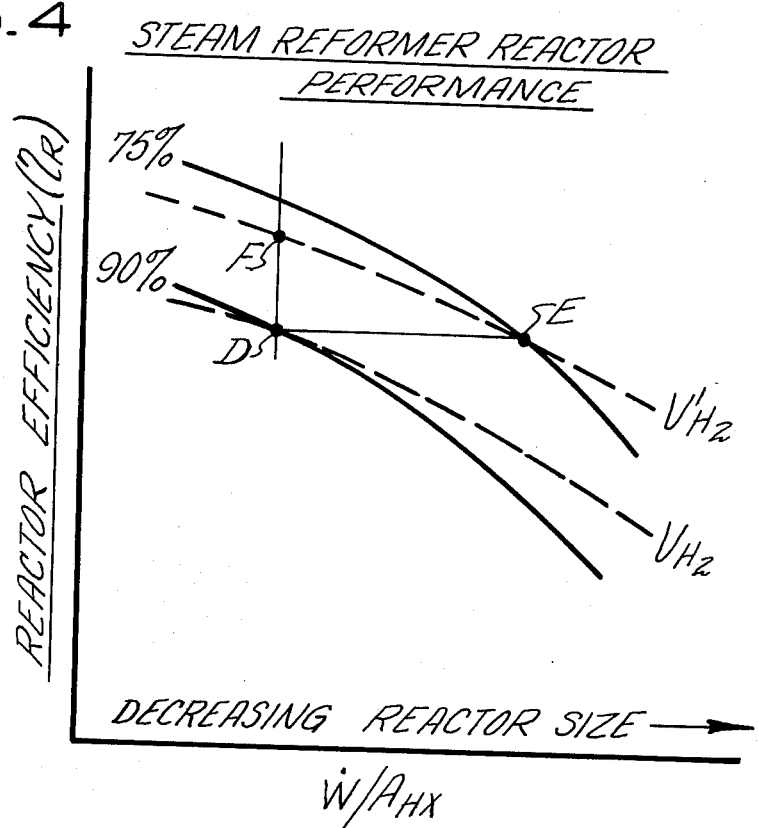
FIG. 4 is a graph illustrating the performance of steam reforming reactors used in power plants of the present invention.

A graph representative of a steam reformer reactor performance is shown in FIG. 4. Reformer efficiency ($\eta_R$) is plotted on the vertical axis and the flow rate of the processed gas stream ($\dot{W}$) divided by the heat transfer area of the reactor ($A_{hx}$) is plotted on the horizontal axis. Since the term $A_{hx}$ is directly related to the size of the reactor, reformer size decreases when moving to the right along the horizontal axis. Reformer efficiency is defined by the following equation:

$$\eta_R = (K) \, U_{H_2} \, (\alpha \beta) \quad 6.$$

where $K$ is a constant, $U_{H_2}$ is hydrogen utilization in the fuel cell, and the product $(\alpha \beta)$ is fuel conversion in the reactor. Fuel conversion $(\alpha \beta)$ is the percent of carbon in the incoming fuel which is converted to $CO_2$. It is representative of the amount of hydrogen produced in the steam reforming reaction. Shown in the graph of FIG. 4 are 90% and 75% fuel conversion curves along with a hydrogen utilization curve labeled $U_{H_2}$ and a hydrogen utilization curve labeled $U'_{H_2}$, the latter representing a higher hydrogen utilization. For the purposes of comparison assume that $U_{H_2}$ is the same hydrogen utilization as represented by the solid curves in FIG. 3 and that $U'_{H_2}$ is the hydrogen utilization represented by the dotted curves of FIG. 3. As discussed with reference to FIG. 3, fuel cells using reactants at atmospheric pressure were constrained to operate at a particular hydrogen utilization $U_{H_2}$ in order to achieve a certain cell voltage for a particular cell size (i.e., such as operating at point A). Having chosen a particular hydrogen utilization it is thus required that the operation of the steam reformer reactor must be somewhere along the hydrogen utilization curve $U_{H_2}$. It is thus a matter of choosing the best combination of reformer efficiency and reformer size for the particular cell. Generally, in order to keep reformer size within resonable limits, fuel conversion in prior art reactors is commonly around 90%. This would put the operation of the steam reformer reactor used with prior art fuel cells at point D. It now becomes clear why it is so important to be able to run the fuel cell at a higher hydrogen utilization. For example, in a power plant designed according to the present invention it is now possible to operate along the curve $U'_{H_2}$. This permits the use of a smaller steam reformer reactor without sacrificing efficiency because the reformer can be run at a lower fuel conversion. This operating point is labeled E in FIG. 4. Of course, if desired, reactor size can be kept the same and reformer efficiency can be greatly improved such as by operating at point F. It is important to note that although there is some loss in fuel cell performance when operating at higher utilizations (see FIG. 3) the fuel cell performance picture is still greatly improved; and, in addition, significant improvements can also be realized in the steam reformer reactor. This is contrary to prior art power plants wherein although a higher reactant utilization in the fuel cell could result in benefits for the steam reformer reactor, these benefits are offset by the detrimental effect on fuel cell performance.

With regard to designing a power plant according to the present invention, it will, of course, be necessary to trade off between seeking improvements in reactor performance and seeking improvements in fuel cell performance. Thus, the reactant utilization, cell size, cell output voltage, reactor size, reactor efficiency, and reactor fuel conversion rate are chosen depending upon the particular goals of the power plant being designed.

In the preferred embodiment it is contemplated that naphtha will be used as the fuel and that the steam reformer reactor 38 will be of the well known type which utilizes a nickel catalyst. The reactor could, however, be any apparatus for generating hydrogen. For example, as heretofore mentioned, although less efficient than a steam reforming reactor, a partial oxidation hydrogen generator may be used and will benefit significantly by the higher reactant gas pressures.

Figure 5:
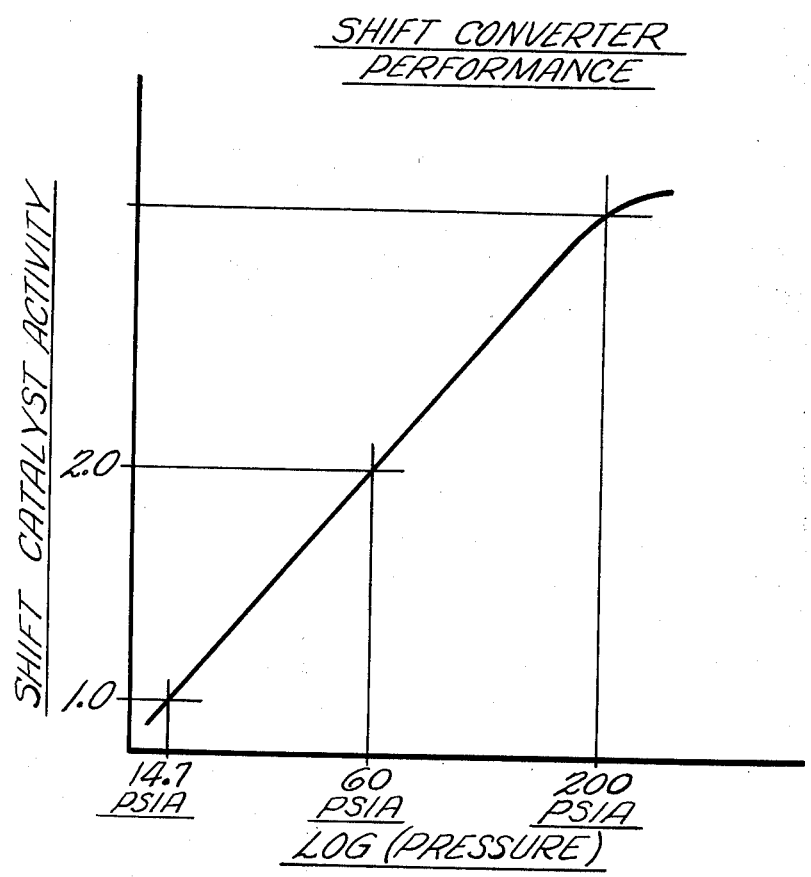
FIG. 5 is a graph of shift converter performance at various pressures.

Refer now to FIG. 5 which is a graph of shift converter performance at constant gas stream temperature. The graph shows that there is a direct relationship between the performance of the shift converter and the pressure of the process gases flowing through the shift converter. Thus, when operating at higher gas pressures, there is an increase in catalyst activity which may be translated into a decrease in shift converter size or, in the alternative, more complete shifting for the same size shift converter. It can readily be seen that the shift catalyst activity doubles when the pressure of the gases flowing therethrough is increased from atmospheric pressure to about 60 psia. This improved shift converter performance is another advantage of being able to operate the fuel cell stack at high reactant gas pressures according to the present invention.

Although the invention has been shown and described with respect to a preferred embodiment thereof, it should be understood by those skilled in the art that other various changes and omissions in the form and detail thereof may be made therein without departing from the spirit and the scope of the invention.

CLAIMS

Having thus described a typical embodiment of our invention, that which we claim as new and desire to secure by Letters Patent of the United States is:

1. A power plant for generating electricity and having a supply of water and a supply of hydrogen containing fuel for use therein comprising:
    a fuel cell stack including a plurality of fuel cells connected electrically in series through a load, each cell comprising a cathode electrode, an anode electrode, an electrolyte disposed therebetween, a cathode gas space on the nonelectrolyte side of said cathode electrode and an anode gas space on the nonelectrolyte side of said anode electrode;
    compressor means including a compressor operably connected to turbine means for compressing air to greater than two atmospheres pressure;
    means for delivering air at a pressure of at least 2 atmospheres from said compressor into said cathode gas space;
    fuel conditioning apparatus including reactor means for producing hydrogen from a hydrogen containing fuel;
    burner means for providing heat to said reactor means;
    means for delivering pressurized hydrogen containing fuel into said reactor means;
    means for delivering at least a first portion of said anode effluent gases into said burner means for providing fuel to said burner means;
    means for delivering pressurized hydrogen from said fuel conditioning apparatus into said anode gas space;
    steam generating means operably associated with said stack for delivering water into heat exchange relationship with said stack for converting at least a portion of said water into steam unsing heat generated in said stack;
    means for delivering at least a portion of said steam into said cathode gas space; and
    means for delivering pressurized effluent gases from said cathode gas space and effluent gases from said burner means into said turbine means for powering said turbine means and driving said compressor.

2. The power plant according to claim 1 wherein said electrolyte is an acid electrolyte.

3. The power plant according to claim 1 wherein said electrolyte is phosphoric acid.

4. The power plant according to claim 1 wherein said reactor means is a steam reformer reactor.

5. The power plant according to claim 1 including means for delivering a portion of said steam into said reactor means.

6. The power plant according to claim 1 wherein said reactor means is a steam reforming reactor and said burner means is a reactor burner including means for delivering pressurized air from said compressor into said reactor burner and means for delivering a portion of said steam into said steam reforming reactor.

7. A power plant for generating electricity and having a supply of water and a supply of hydrogen containing fuel for use therein comprising:
    a fuel cell stack including a plurality of fuel cells connected electrically in series through a load, a thermal management portion in heat exchange relationship with said cells, each cell comprising a cathode electrode, an anode electrode, an electrolyte disposed therebetween, a cathode gas space on the nonelectrolyte side of said cathode electrode and an anode gas space on the nonelectrolyte side of said anode electrode;

compressor means including a compressor operably connected to turbine means for compressing air to greater than 2 atmospheres pressure;

means for delivering air at a pressure of at least 2 atmospheres from said compressor into said cathode gas space;

fuel conditioning apparatus including a steam reforming reactor for producing hydrogen from steam and a hydrogen containing fuel;

burner means for providing heat to said reactor means;

means for delivering pressurized hydrogen containing fuel into said reactor means;

means for delivering at least a first portion of said anode effluent gases into said burner means for providing fuel to said burner means;

means for delivering water into said thermal management portion for converting at least a portion of said water into steam;

steam separator means operably associated with said thermal management portion for receiving effluent steam and water from said thermal management portion and for separating said steam from said water;

means for delivering at least a portion of said steam from said steam separating means into said cathode gas space and another portion of said steam from said separator means into said reactor means;

means for delivering pressurized hydrogen from said fuel conditioning apparatus into said anode gas space; and means for delivering pressurized effluent gases from said cathode gas space and effluent gases from said burner means into said turbine means for powering said turbine means and driving said compressor.

8. The power plant according to claim 7 wherein said means for delivering water into said thermal management portion includes means for delivering water from said steam separator means into said thermal management portion.

9. The power plant according to claim 7 wherein said means for delivering water into said thermal management portion includes means for maintaining a constant mass flow of water into said thermal management portion, said power plant also including means operably associated with said stack for maintaining a constant temperature of said stack including means responsive to the temperature of said stack for regulating the pressure and thus the boiling point of the water delivered into said thermal management portion.

10. The power plant according to claim 9 wherein said means responsive to the temperature of said stack comprises valve means for controlling the amount of steam delivered from said steam separator means into said cathode gas space.

11. In the process for generating electricity in a power plant comprising a supply of hydrogen containing fuel, a supply of water, fuel conditioning apparatus including reactor means, a compressor operably connected to turbine means, and a fuel cell stack including a plurality of fuel cells connected electrically in series through a load, each cell comprising a cathode electrode, an anode electrode, an electrolyte disposed therebetween, a cathode gas space on the nonelectrolyte side of said cathode electrode and an anode gas space on the nonelectrolyte side of said anode electrode, the steps of:

compressing air to greater than two atmospheres pressure in said compressor;

delivering said compressed air at greater than two atmospheres pressure from said compressor into said cathode gas space;

delivering pressurized hydrogen containing fuel into said reactor means;

producing hydrogen in said reactor means;

providing heat for said step of producing hydrogen by burning anode effluent gases in a burner;

delivering pressurized hydrogen from said fuel conditioning apparatus into said anode gas space;

delivering water into heat exchange relationship with said stack and converting at least a portion of said water into steam by heat generated in said stack;

delivering at least a portion of said steam into said cathode gas space;

delivering effluent from said cathode gas space and burner into said turbine means for driving said compressor.

12. The process according to claim 11 including delivering a portion of said steam into said reactor means and wherein said step of producing hydrogen includes steam reforming said hydrogen containing fuel.

13. The process according to claim 11 wherein after said step of converting a portion of said water into steam the step of separating said steam from that portion of said water not converted to steam and recirculating that portion of the water not converted to steam back into heat exchange relationship with said stack.

14. The process according to claim 12 including the step of maintaining the stack temperature substantially constant comprising the steps of 1) maintaining a constant mass flow of liquid water in heat exchange relationship with said stack and 2) controlling the pressure and thus the boiling point of the water flowing into heat exchange relationship with said stack.

15. The process according to claim 14 wherein said step of controlling the pressure includes the step of controlling the amount of steam delivered into said cathode gas space.

16. The process according to claim 11 wherein said step of delivering water into heat exchange relationship with said stack includes maintaining the stack temperature substantially constant by 1) maintaining a constant mass flow of liquid water in heat exchange relationship with said stack, 2) controlling the pressure and thus the boiling point of the water flowing into heat exchange relationship with said stack comprising controlling the amount of said steam delivered into said cathode gas space, 3) separating the steam produced from that portion of said water not converted to steam, and 4) recirculating that portion of the water not converted to steam back into heat exchange relationship with said stack.

* * * * *